(12) United States Patent
Ahola

(10) Patent No.: US 8,998,541 B2
(45) Date of Patent: Apr. 7, 2015

(54) ROCK BOLT

(75) Inventor: Tomi Ahola, Pori (FI)

(73) Assignee: Suomen Metallityö Oy, Pori (FI)

(*) Notice: Subject to any disclaimer, the term of this patent is extended or adjusted under 35 U.S.C. 154(b) by 0 days.

(21) Appl. No.: 13/985,745

(22) PCT Filed: Feb. 9, 2012

(86) PCT No.: PCT/FI2012/050128
§ 371 (c)(1),
(2), (4) Date: Oct. 24, 2013

(87) PCT Pub. No.: WO2012/113976
PCT Pub. Date: Aug. 30, 2012

(65) Prior Publication Data
US 2014/0037388 A1 Feb. 6, 2014

(30) Foreign Application Priority Data
Feb. 24, 2011 (FI) .................................. 20115182

(51) Int. Cl.
*E21D 21/00* (2006.01)
*E02D 5/80* (2006.01)
*E21D 20/02* (2006.01)

(52) U.S. Cl.
CPC ............. *E02D 5/805* (2013.01); *E21D 20/02* (2013.01); *E21D 21/0033* (2013.01); *E02D 5/808* (2013.01)

(58) Field of Classification Search
CPC ....... E21D 20/00; E21D 20/02; E21D 20/025; E21D 20/028; E21D 21/00; E21D 21/0033; E21D 21/0026; E21D 21/008
USPC ............................................ 405/259.1–259.5
See application file for complete search history.

(56) References Cited

U.S. PATENT DOCUMENTS 3,695,045 A * 10/1972 Williams .................. 405/259.5
4,449,855 A * 5/1984 Langwadt ................. 405/259.5
(Continued)

FOREIGN PATENT DOCUMENTS

DE 31 05 038 A1 9/1982
EP 1 546 508 B1 1/2011
(Continued)

OTHER PUBLICATIONS

International Search Report for corresponding International Patent Application No. PCT/FI2012050128 mailed May 29, 2012.
(Continued)

*Primary Examiner* — Benjamin Fiorello
(74) *Attorney, Agent, or Firm* — Merchant & Gould P.C.

(57) ABSTRACT

A rock bolt to be installed into a borehole (1) drilled in a rock is described. The rock bolt includes wherein an expansion member (9) of the rock bolt includes an internal second cone abutment surface (12) in the interior of the expansion member in the vicinity of a second end thereof. A second cone member is at least partially fitted in the interior of the second end of the expansion member. The second cone member includes a hole (14), through which a drawbar is adapted to extend with a clearance, and a second cone surface (15) tapering inward relative to the expansion member and abutting against the second cone abutment surface (12) of the expansion member. A first end (17) of an elongated pushing member bears on tightening members and a second end (18) bears against the second cone member on the opposite side relative to the expansion member so that, as the drawbar is tightened by the tightening members, the pushing member simultaneously pushes the second cone member to the interior of the expansion member for expanding the expansion member and engaging the expansion member to the wall of the borehole.

8 Claims, 4 Drawing Sheets

(56) References Cited

U.S. PATENT DOCUMENTS

Figure 1:
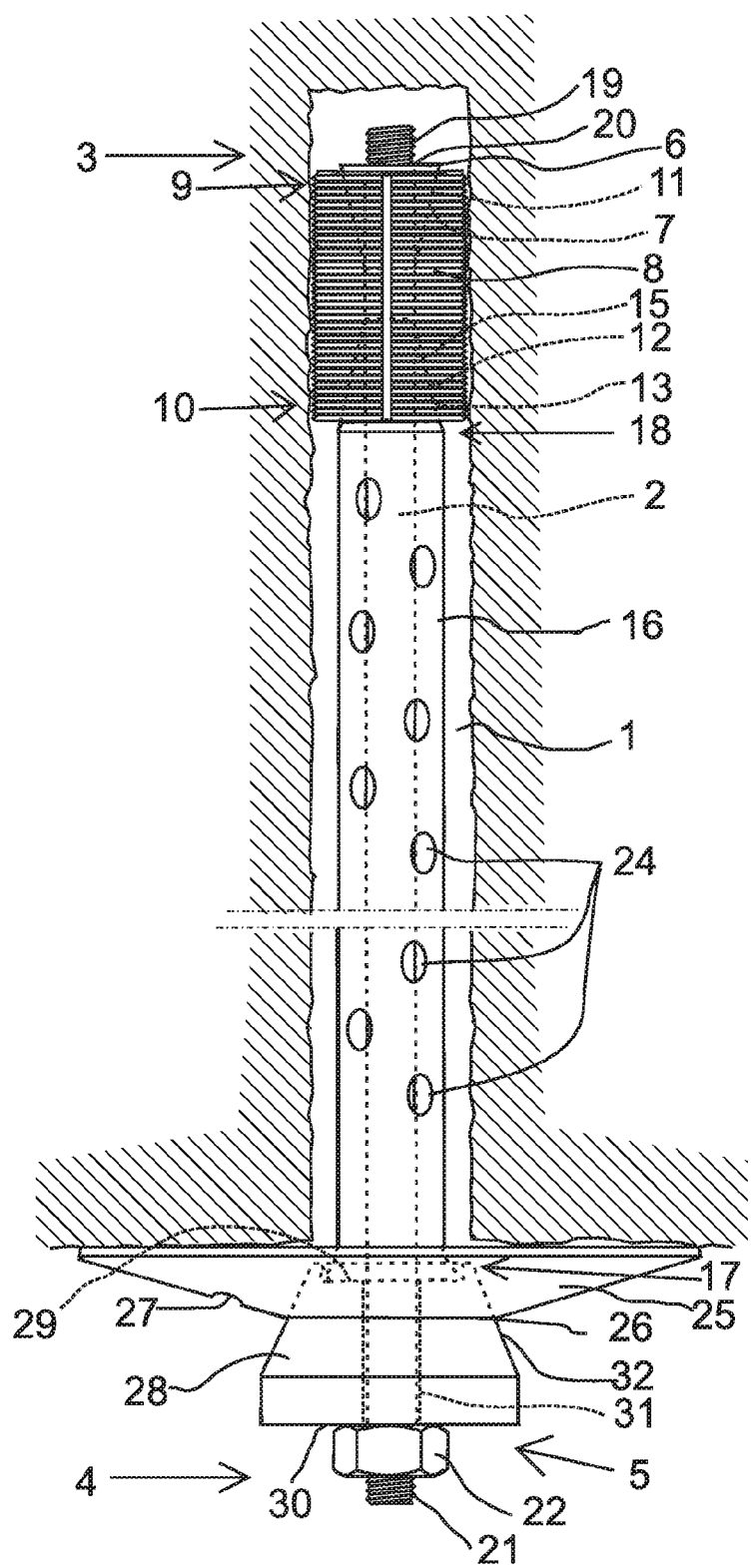

| | | | |
|---|---|---|---|
| 4,655,644 A | 4/1987 | Lane et al. | |
| 4,764,055 A | 8/1988 | Clark et al. | |
| 4,848,971 A | 7/1989 | Price Jr. | |
| 4,904,123 A | 2/1990 | Calandra, Jr. et al. | |
| 5,636,945 A | 6/1997 | Nes | |
| 5,791,824 A * | 8/1998 | Radtke | 405/259.5 |
| 7,381,013 B1 * | 6/2008 | Rataj et al. | 405/259.5 |
| 8,678,729 B2 * | 3/2014 | Salgado | 411/15 |
| 2001/0046418 A1 * | 11/2001 | Lay | 405/259.4 |
| 2010/0278593 A1 * | 11/2010 | Cook | 405/259.3 |
| 2012/0177448 A1 * | 7/2012 | Steyn et al. | 405/259.5 |

FOREIGN PATENT DOCUMENTS

| | | |
|---|---|---|
| JP | 56-015811 U | 2/1981 |
| SU | 909198 A1 | 2/1982 |
| WO | WO 01/40628 A1 | 6/2001 |
| WO | WO 2004/013463 A1 | 2/2004 |
| WO | WO 2010/115218 A1 | 10/2010 |

OTHER PUBLICATIONS

International Preliminary Report on Patentability for corresponding International Patent Application No. PCT/FI2012/050128 mailed Jun. 19, 2013.

* cited by examiner

ROCK BOLT

This application is a National Stage Application of PCT/FI2012/050128, filed 9 Feb. 2012, which claims benefit of Serial No. 20115182, filed 24 Feb. 2011 in Finland and which applications are incorporated herein by reference. To the extent appropriate, a claim of priority is made to each of the above disclosed applications.

FIELD OF THE INVENTION

The invention relates to a rock bolt.

BACKGROUND OF THE INVENTION

A rock bolt is a long anchor bolt used to reinforce rock cuts, cavities and walls of tunnels. A rock bolt installed in its place can also be used for suspension of various structures. Typically in reinforcing a rock, rock bolts are used as an array of several rock bolts installed at a distance from each other. Rock bolts function in such a way as to bind the rock mass present in the vicinity of the surface of the rock, which may include openings and boulders, to the firmer and more solid internal part of the rock and this way to prevent rockfall.

Installation of a rock bolt is carried out in such a way as to drill a long closed hole into the wall of the rock to be reinforced for each rock bolt. The rock bolt is inserted into the closed hole for a desired depth. The rock bolt is secured in its place by expanding an expansion member present at the inner end, i.e. the tip, of the rock bolt so that the expansion member becomes pressed against the wall of the borehole. Finally, a binder, such as concrete or resin, is injected into the borehole around the rock bolt for cementing the rock bolt.

Rock bolts are known from the prior art, for example from publications EP 1546508 B1, U.S. Pat. Nos. 5,636,945, 4,655,644, 4,764,055, 4,848,971 and 4,904,123.

In this description the term "inner" means that the part is located deeper in the borehole within the rock than another part characterized by the term "outer".

A rock bolt includes a drawbar having an inner end to be inserted into the borehole and an outer end extending out from the borehole. Further, the rock bolt includes tightening members provided at the outer end of the drawbar for drawing the drawbar outward relative to the borehole in order to tighten the rock bolt in its place. Further, the rock bolt includes a first cone member substantially immovably connected to the drawbar in the vicinity of the inner end, and a first cone surface. In addition, the rock bolt includes an expansion member including a first end which is the end on the side of the inner end of the drawbar, a second end which is the end on the side of the outer end of the drawbar, and a first cone abutment surface. The first cone abutment surface is located in the interior of the expansion member in the vicinity of the first end thereof. The first cone member is provided in the interior of the first end of the expansion member in such a way that the first cone surface abuts against the first cone abutment surface. The cone member functions as a wedge which expands the expansion member as it penetrates deeper therein. The expansion member is adapted to expand as the drawbar is drawn outward by means of the tightening members and the first cone member is simultaneously moved relative to the expansion member for expanding the expansion member and engaging the expansion member to the wall of the borehole. The expansion member includes an internal second cone abutment surface located in the interior of the expansion member in the vicinity of the second end thereof. The rock bolt further includes a second cone member at least partially fitted in the interior of the second end of the expansion member. The second cone member includes a through hole, through which the drawbar is adapted to extend with a clearance, and a second cone surface tapering inward relative to the expansion member and abutting against the second cone abutment surface of the expansion member. In addition, the rock bolt includes an elongated pushing member having a first end bearing on the tightening members and a second end bearing against the second cone member on the opposite side relative to the expansion member so that, as the drawbar is tightened by the tightening members, the pushing member simultaneously pushes the second cone member to the interior of the expansion member for expanding the expansion member and engaging the expansion member to the wall of the borehole. The second pushing member is a tube fitted around the drawbar.

The two cone members provide expansion of the expansion member simultaneously at both ends, thereby providing safety-increasing immediate locking in place instantly at the beginning of tightening. The final tightening can be carried out without hurry. The tightening is easy because it can be effected with a low torque.

Regarding the rock bolts provided with the biconical wedge and expansion anchoring mechanism according to the prior art described above, reference is also made to publications JP 5601811U and DE 3105038 A1. A problem therein is that the use of a binder to be injected is not possible.

OBJECTIVE OF THE INVENTION

The objective of the invention is to eliminate the drawbacks referred to above.

Particularly, it is an objective of the invention to disclose a rock bolt which is safer and easier to use than before.

SUMMARY OF THE INVENTION

The rock bolt to be installed into a borehole drilled in a rock, the rock bolt including: a drawbar having an inner end to be inserted into the borehole and an outer end extending out from the borehole; tightening members provided at the outer end of the drawbar for drawing the drawbar outward relative to the borehole in order to tighten the rock bolt in its place; a first cone member substantially immovably connected to the drawbar in the vicinity of the inner end, including a first cone surface; an expansion member including a first end which is the end on the side of the inner end of the drawbar, a second end is the end on the side of the outer end of the drawbar, and a first cone abutment surface in the interior of the expansion member in the vicinity of the first end thereof, the first cone member being provided in the interior of the first end so that the first cone surface abuts against the first cone abutment surface, the expansion member being adapted to expand as the drawbar is drawn outward by means of the tightening members and the first cone member is simultaneously moved relative to the expansion member for expanding the expansion member and engaging the expansion member to the wall of the borehole, the expansion member including an internal second cone abutment surface in the interior of the expansion member in the vicinity of the second end thereof; a second cone member at least partially fitted in the interior of the second end of the expansion member, the second cone member having a hole, through which the drawbar is adapted to extend with a clearance, and a second cone surface tapering inward relative to the expansion member and abutting against the second cone abutment surface of the expansion member; and an elongated pushing member having a first end bearing on the tightening members and a second end bearing against the second cone member on the opposite side relative to the expansion member so that, as the drawbar is tightened by the tightening means, the pushing member simultaneously pushes the second cone member to the interior of the expansion member -for expanding the expansion member and engaging the expansion member to the wall of the borehole, the second pushing member being a tube fitted around the drawbar, wherein the drawbar is a reinforcement steel bar; that the rock bolt includes a casting space between the tube and the drawbar for receiving a binder to be injected; and that the tube includes a number of casting holes provided for a substantial portion of the length of the tube for allowing an injected binder to flow between the space between the tube and the wall of the borehole and the internal casting space of the tube.

According to the invention, the tube includes a number of casting holes provided for a substantial portion of the length of the tube for allowing an injected binder to flow between the space between the tube and the wall of a borehole and the casting space of the tube.

The advantage of the invention is that the casting holes enable the flow of the binder to be injected between the space between the tube and the wall of a borehole and the internal casting space of the tube.

In one embodiment of the rock bolt the inner end of the drawbar includes an external thread. The first cone member includes an internal thread screwed onto the external thread of the drawbar.

In one embodiment of the rock bolt the outer end of the drawbar includes a second external thread. The tightening members include a tightening nut screwed onto the second external thread.

In one embodiment of the rock bolt the drawbar is a reinforcement steel bar.

In one embodiment of the rock bolt the tightening members include a support plate for supporting the outer end of the rock bolt against the surface of the rock around the borehole, the support plate having a center hole and an injection hole spaced apart from the center hole for the purpose of injecting a binder.

In one embodiment of the rock bolt the tightening members include a centering member provided to the outer end of the drawbar and adapted to bear on the edge of the center hole of the support plate.

In one embodiment of the rock bolt the centering member includes an inner end and an outer end. A central hole extends between the outer end and the inner end. The outer end of the drawbar provided with the second external thread is adapted to extend through the hole. The diameter of the hole is greater than the diameter of the second external thread so that the centering member can slide over the second external thread. Further, the centering member includes a lateral cone surface tapering toward the inner end and bearing on the edge of the center hole of the support plate.

In one embodiment of the rock bolt the centering member includes an air exhaust and check hole extending between the outer end and the inner end and allowing removal of air as a binder is injected and checking of the sufficiency of the binder.

In one embodiment of the rock bolt the tightening nut is screwed onto the second external thread against the outer end of the centering member.

LIST OF FIGURES

Figure 2:
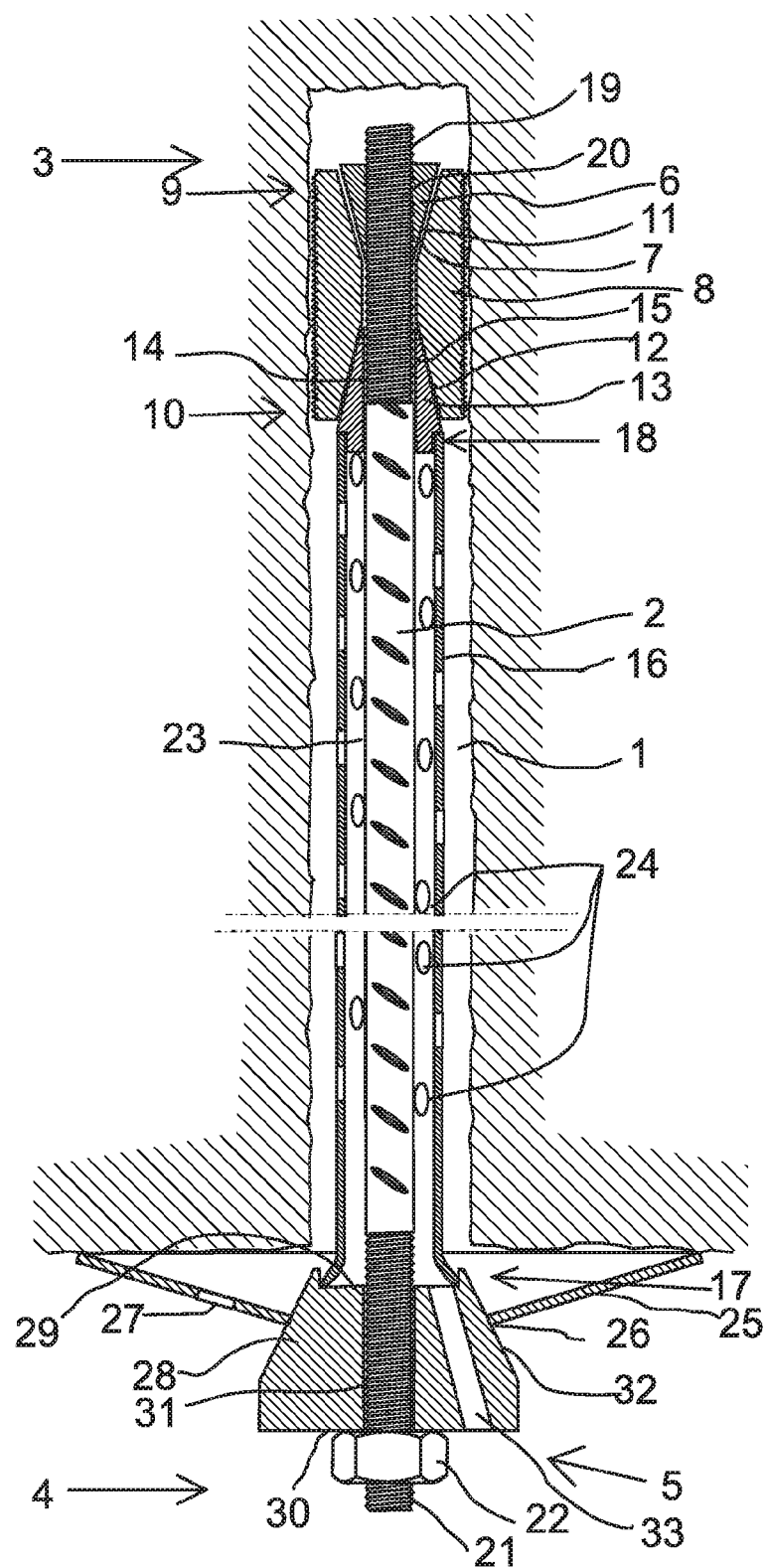
Figure 3:
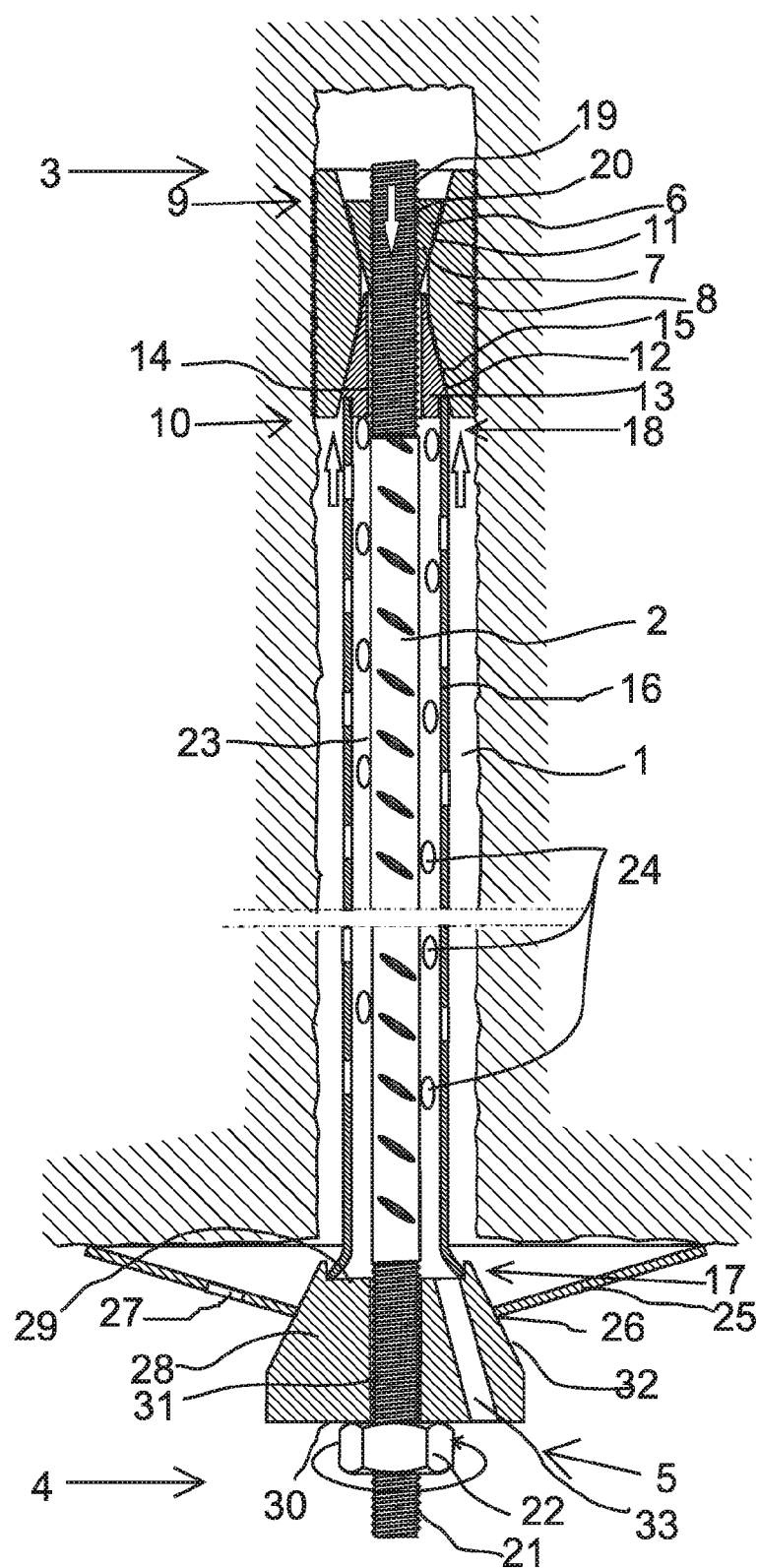
Figure 4:
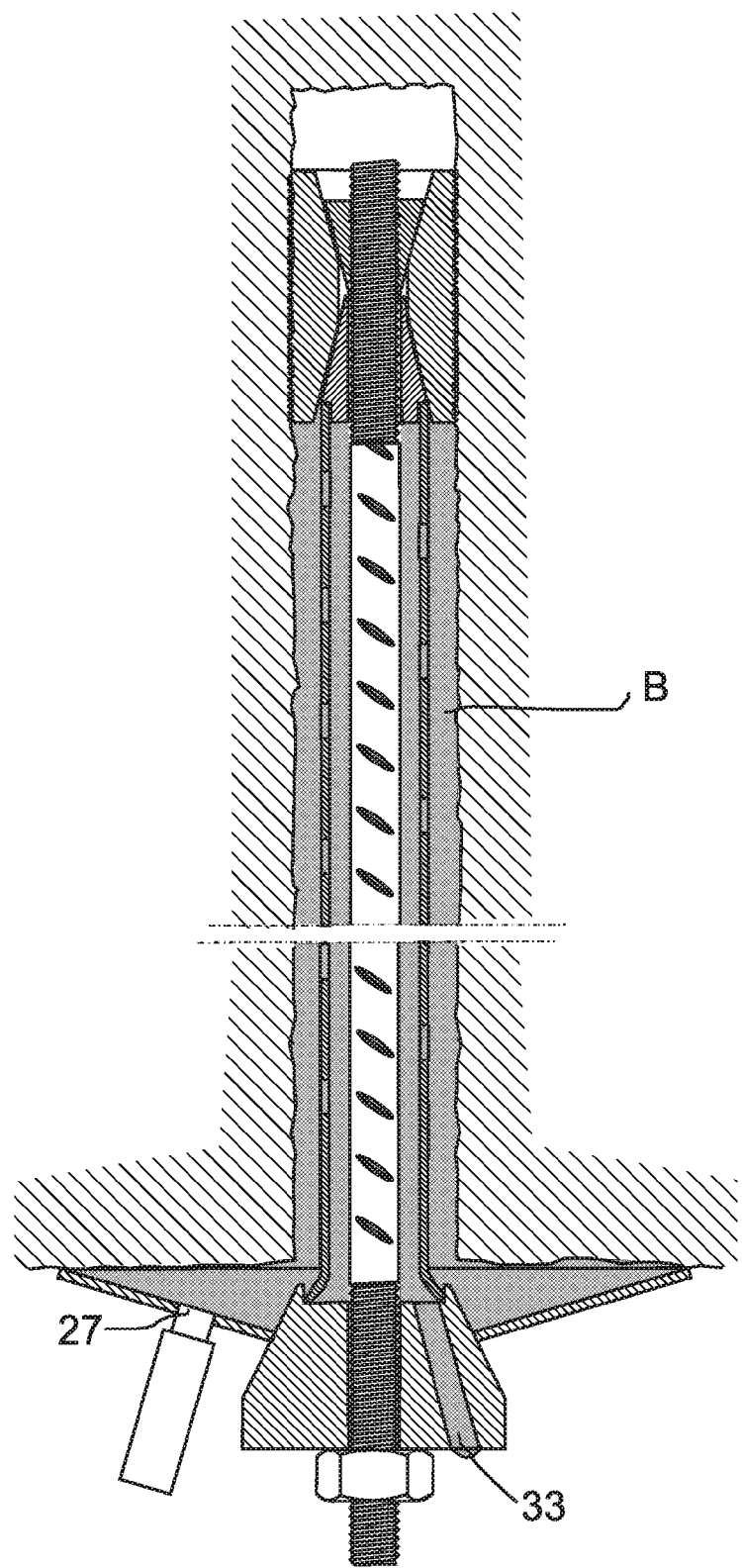

In the following section the invention will be described in detail using exemplifying embodiments with reference to the accompanying drawing in which FIG. 1 illustrates a first embodiment of the rock bolt according to the invention in a borehole, FIG. 2 illustrates the rock bolt of FIG. 1 in cross section, FIG. 3 illustrates the rock bolt of FIG. 2 being tightened in its place, and FIG. 4 illustrates the rock bolt of FIG. 3 after injection of a binder.

DETAILED DESCRIPTION OF THE INVENTION

FIG. 1 shows a rock bolt inserted into a borehole 1 drilled in a rock in order to be tightened in its place.

With reference to FIGS. 1 to 4 the rock bolt includes a drawbar 2 having an inner end 3 to be inserted into the borehole and an outer end 4 extending out from the borehole. The drawbar 2 is preferably a reinforcement steel bar.

The outer end 4 of the drawbar 2 includes tightening members 5 to be used for drawing the drawbar 2 outward relative to the borehole 1 for expanding an expansion member 8 and in order to tighten the rock bolt in its place. The locking is provided by a type of biconical wedge and expansion anchoring mechanism at the inner end 3 of the drawbar 2. The structure of the mechanism referred to above is disclosed in more detail in FIG. 2.

With reference to FIG. 2 a first cone member 6 including a first cone surface 7 is substantially immovably connected to the drawbar 2 in the vicinity of the inner end 3. For this purpose the inner end 3 of the drawbar 2 includes an external thread 19. The first cone member 6 includes an internal thread 20 screwed onto the external thread 19 of the drawbar. The anchoring mechanism further includes the expansion member 8 having a first cone abutment surface 11 in the interior of the expansion member 8 in the vicinity of a first end 9 thereof. The first cone member 6 is provided in the interior of the first end 9 of the expansion member 8 so that the first cone surface 7 abuts against the first cone abutment surface 11. The expansion member 8 is adapted to expand when the drawbar 2 is drawn outward by means of the tightening members 5, in which case the first cone member 6 simultaneously moves inward relative to the expansion member 8 for expanding the expansion member and engaging it to the wall of the borehole 1. The expansion member 9 also includes a second cone abutment surface 12 in the interior of the expansion member in the vicinity of the second end 10 thereof. A second cone member 13 is at least partially fitted in the interior of the second end 10 of the expansion member 8. The second cone member 13 includes a hole 14, through which the drawbar 2 is adapted to extend with a clearance so that the second cone member 13 can slide relative to the drawbar 2. In addition, the second cone member 13 includes a second cone surface 15 tapering in an inward direction relative to the expansion member 8 and abutting against the second cone abutment surface 12 of the expansion member 8. A first end 17 of an elongated pushing member 16 bears on the tightening members 5 and a second end 18 bears against the second cone member 13 on the opposite side relative to the expansion member 8 so that, as the drawbar 2 is tightened by the tightening members 5, the pushing member 16 simultaneously pushes the second cone member 13 to the interior of the expansion member 8 for expanding the expansion member and engaging the expansion member to the wall of the borehole 1 as illustrated in FIG. 3.

The tube 16 forming the pushing member 16 is provided around the drawbar 2 so that between the tube and the drawbar 2 there remains a casting space 23 for receiving a binder B to be injected. The tube 16 includes a number of casting holes 24 provided for a substantial portion of the length of the tube.

The casting holes 24 enable the flow of an injected binder B between the space between the tube 16 and the wall of a borehole 1 and the casting space 23.

The tightening members 5 include a tightening nut 22 screwed onto a second external thread 21 present at the outer end 4 of the drawbar 2. Further, the tightening members 5 include a support plate 25 for supporting the outer end of the rock bolt against the surface of the rock around a borehole 1. The support plate 25 includes a center hole 26 and an injection hole 27 spaced apart from the center hole 26. A binder B is injectable to the interior of the rock bolt and into of a borehole via the injection hole 27 as depicted in FIG. 4.

Further, the tightening members 5 include a centering member 28 at the outer end 4 of the drawbar 2 adapted to bear on the edge of the center hole 27 of the support plate 25. The centering member 28 includes a central hole 31 extending between an outer end 29 and an inner end 30 of the centering member. The outer end 4 of the drawbar 2 provided with the second external thread 21 extends through the hole 31. The tightening nut 22 is screwed onto the second external thread 21 against the outer end 30 of the centering member 28. The diameter of the hole 31 is greater than the diameter of the second external thread 21 so that the drawbar can freely move relative to the centering member 28. The centering member 28 also includes a lateral cone surface 32 tapering toward the inner end 29, the lateral cone surface bearing on the edge of the center hole 26 of the support plate 25. Further, the centering member 28 includes an air exhaust and check hole 33 extending between the outer end 30 and the inner end 29 and allowing air removal as a binder B is injected via the injection hole 27 of the support plate. When the binder B starts to overflow from the air exhaust and check hole 33, a sufficient amount of binder B has been injected.

The invention is not limited merely to the exemplifying embodiments referred to above; instead, many variations are possible within the scope of the inventive idea defined by the claims.

The invention claimed is:

1. A rock bolt to be installed into a borehole drilled in a rock, the rock bolt including:
   a drawbar having an inner end to be inserted into the borehole and an outer end extending out from the borehole;
   tightening members provided at the outer end of the drawbar for drawing the drawbar outward relative to the borehole in order to tighten the rock bolt in its place;
   a first cone member substantially immovably connected to the drawbar in the vicinity of the inner end, including a first cone surface;
   an expansion member including a first end which is the end on the side of the inner end of the drawbar, a second end is the end on the side of the outer end of the drawbar, and a first cone abutment surface in the interior of the expansion member in the vicinity of the first end thereof, the first cone member being provided in the interior of the first end so that the first cone surface abuts against the first cone abutment surface, the expansion member being adapted to expand as the drawbar is drawn outward by means of the tightening members and the first cone member is simultaneously moved relative to the expansion member for expanding the expansion member and engaging the expansion member to the wall of the borehole, the expansion member including an internal second cone abutment surface in the interior of the expansion member in the vicinity of the second end thereof;
   a second cone member at least partially fitted in the interior of the second end of the expansion member, the second cone member having a hole, through which the drawbar is adapted to extend with a clearance, and a second cone surface tapering inward relative to the expansion member and abutting against the second cone abutment surface of the expansion member; and
   an elongated pushing member having a first end bearing on the tightening members and a second end bearing against the second cone member on the opposite side relative to the expansion member so that, as the drawbar is tightened by the tightening means, the pushing member simultaneously pushes the second cone member to the interior of the expansion member for expanding the expansion member and engaging the expansion member to the wall of the borehole, the second pushing member being a tube fitted around the drawbar, wherein the drawbar is a reinforcement steel bar; that the rock bolt includes a casting space between the tube and the drawbar for receiving a binder to be injected; and that the tube includes a number of casting holes provided for a substantial portion of the length of the tube for allowing an injected binder to flow between the space between the tube and the wall of the borehole and the internal casting space of the tube.

2. The rock bolt according to claim 1, wherein the inner end of the drawbar includes an external thread; and that the first cone member includes an internal thread screwed onto the external thread of the drawbar.

3. The rock bolt according to claim 2, wherein the outer end of the drawbar includes a second external thread; and that the tightening members include a tightening nut screwed onto the second external thread.

4. The rock bolt according to claim 3, wherein the tightening members include a support plate for supporting the outer end of the rock bolt against the surface of the rock around the borehole, the support plate having a center hole and an injection hole spaced apart from the center hole for the purpose of injecting the binder.

5. The rock bolt according to-claim 4, wherein the tightening members include a centering member provided at the outer end of the drawbar and adapted to bear on the edge of the center hole of the support plate.

6. The rock bolt according to claim 5, the centering member includes
   an inner end,
   an outer end
   a central hole extending between the outer end and the inner end, through which hole the outer end of the drawbar provided with the second external thread is adapted to extend, the diameter of the hole being greater than the outside diameter of the second external thread,
   a lateral cone surface tapering toward the inner end, the lateral cone surface bearing on the edge of the center hole of the support plate.

7. The rock bolt according to claim 6, the tightening nut is screwed onto the second external thread against the outer end of the centering member.

8. The rock bolt according to claim 5, wherein the centering member includes an air exhaust and check hole extending between the outer end and the inner end and allowing air removal as the binder is injected and checking of the sufficiency of the binder.

* * * * *